Sept. 26, 1967 N. T. GENERAL 3,343,367
HYDROKINETIC CONVERTER MECHANISM WITH MULTIPLE TURBINES
Filed Jan. 5, 1966 2 Sheets-Sheet 2
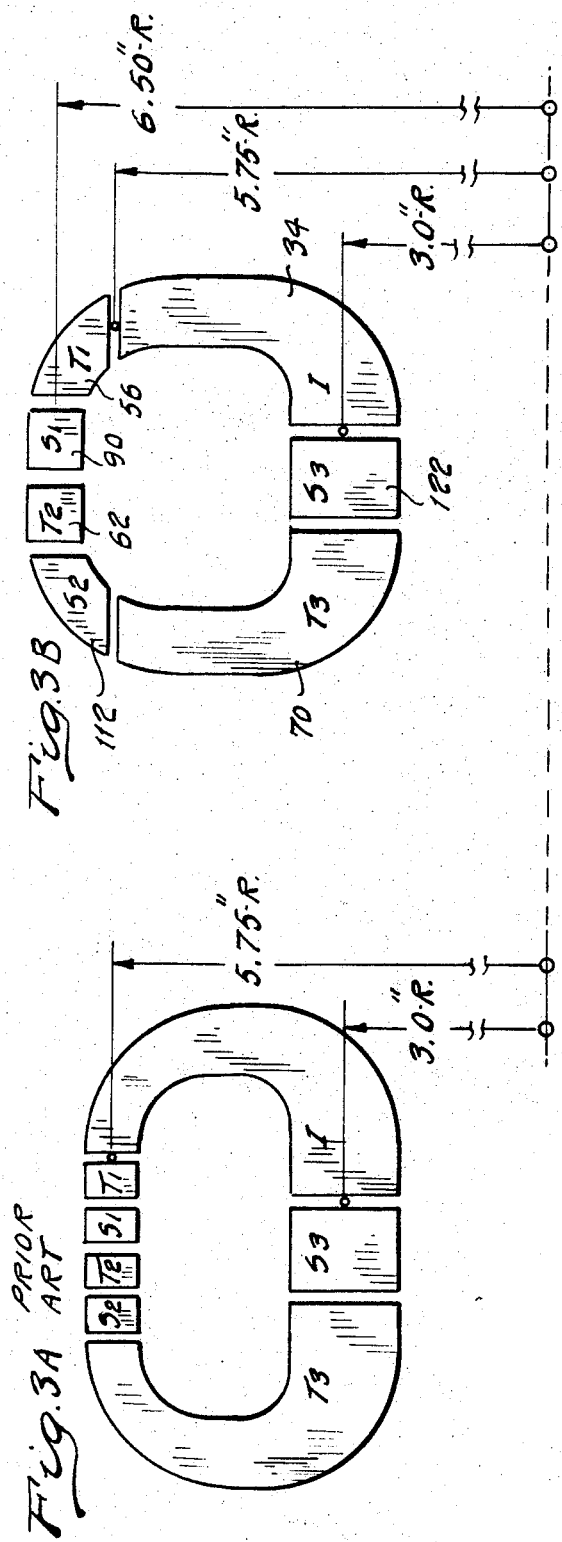
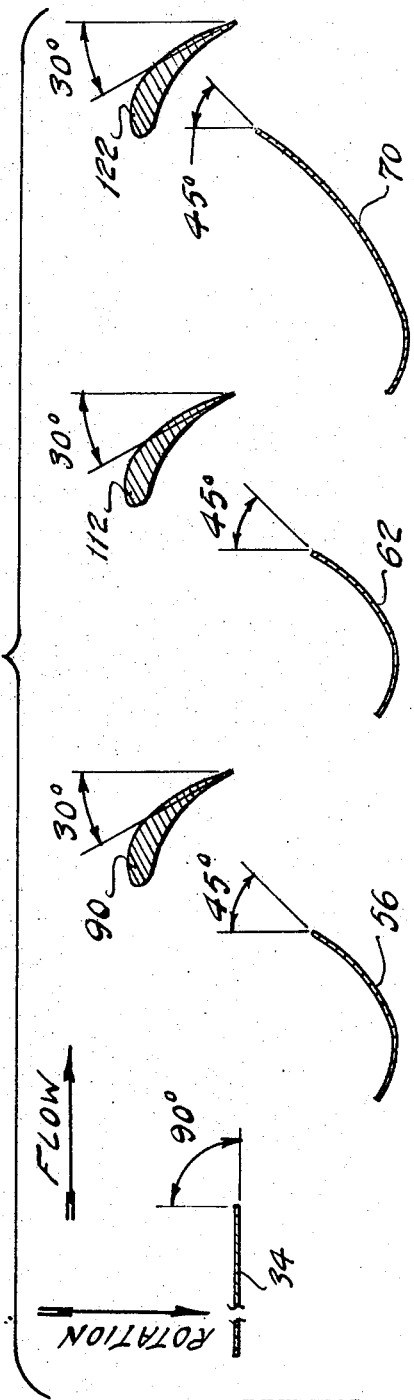
INVENTOR:
NORMAN T. GENERAL
BY
ATTORNEYS.

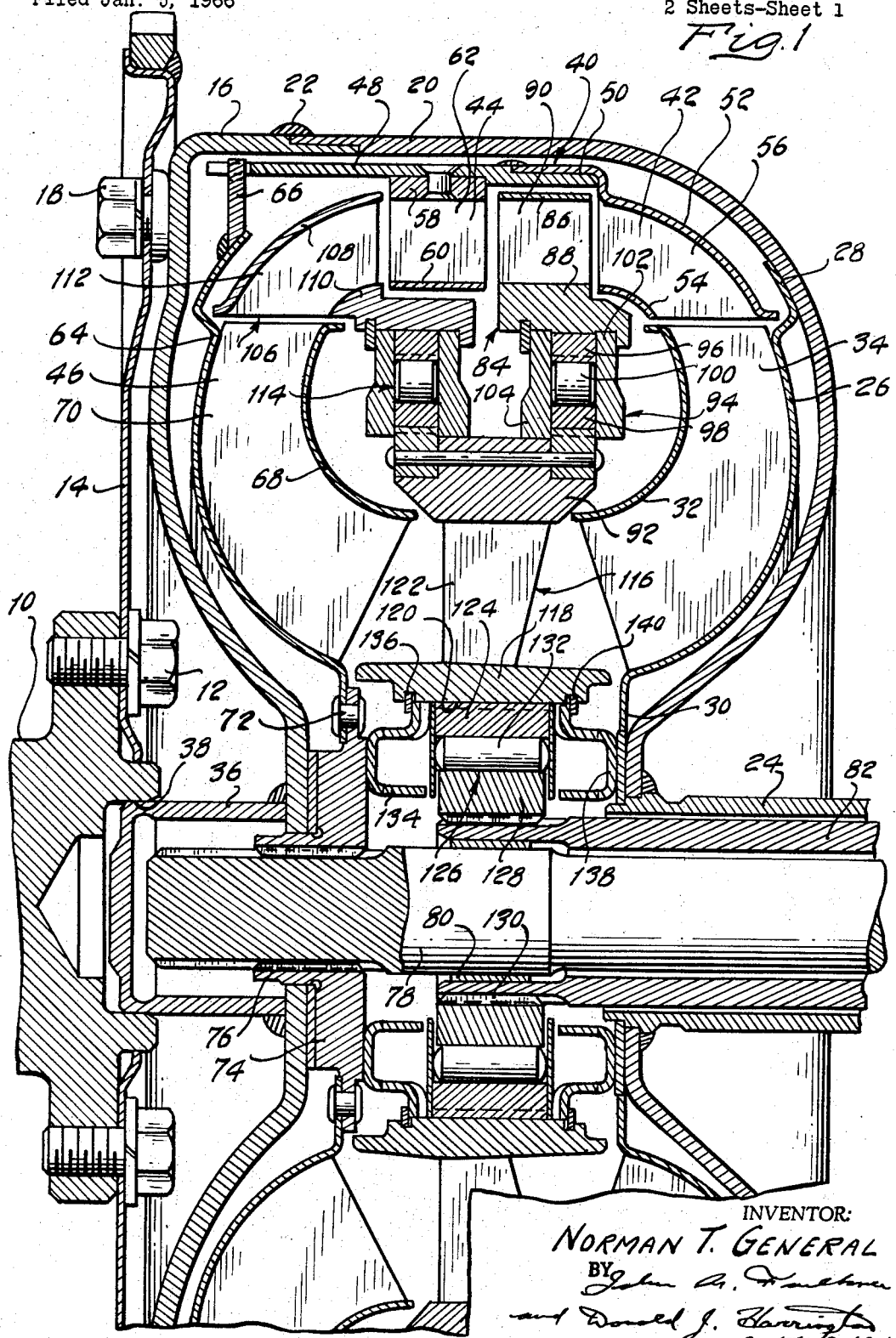

United States Patent Office 3,343,367
Patented Sept. 26, 1967

3,343,367
HYDROKINETIC CONVERTER MECHANISM WITH MULTIPLE TURBINES
Norman T. General, Farmington, Mich., assignor to Ford Motor Company, Dearborn, Mich., a corporation of Delaware
Filed Jan. 5, 1966, Ser. No. 518,934
4 Claims. (Cl. 60—54)

My invention relates generally to hydrokinetic torque converter mechanisms for use in an automobile vehicle driveline. It relates more particularly to improvements in a multiple turbine hydrokinetic torque converter unit comprising multiple turbines situated in a common torus circuit, each turbine being connected to a common turbine shaft.

My inproved construction includes also an impeller that is connected to a source of torque such as an internal combustion engine in an automobile vehicle driveline. The flow exit section of the impeller directs hydrokinetic fluid into the first turbine section where a decrease in the moment of momentum of the fluid takes place. This is preceded by an increase in the moment of momentum of the fluid as the fluid traverses the bladed passages of the first impeller stage with an increasing radius.

The first turbine stage is followed by the first stator stage, which is anchored to a stationary portion of the mechanism through an overruning coupling in the usual fashion. The first stator stage is situated directly adjacent the flow entrance section of the second turbine stage. Both the second turbine stage and first stator stage are located at a maximum radius in the toroidal fluid flow circuit.

A second stator stage is situated between the flow exit region of the second turbine stage and the flow entrance region of the third turbine stage, the latter being situated in a radial inflow portion of the toroidal fluid flow circuit. The hydrokinetic fluid passing through the bladed passages of the second stator stage changes its direction thereby altering the tangential component of the absolute fluid flow velocity vector for the fluid that enters the entrance section of the third turbine stage. The disposition of the turbine assembly in the torus circuit in this fashion provides a higher hydrokinetic torque ratio for any given converter capacity. The provision of a hydrokinetic unit of this type is an object of my invention.

It is a further object of my invention to provide a hydrokinetic torque converter mechanism having multiple turbines arranged in alternating disposition with respect to a compound stator assembly in a common torus circuit wherein the operating radius of a particle of fluid passing through the bladed passages of the first turbine stage progressively increases.

It is a further object of my invention to provide a hydrokinetic torque converter mechanism having multiple turbines and multiple stators arranged in toroidal fluid flow relationships in a common torus circuit and which is characterized by reduced axial dimensions for any given converter capacity. Because of this feature, my improved converter mechanism can be used in driveline arrangements which require minimum axial dimensions.

Further objects and features of my invention will become apparent from the following description and from the accompanying drawings, wherein:

FIGURE 1 shows in cross-sectional form a torque converter assembly embodying the improvements of my invention;

FIGURE 2 shows in schematic form a blade cascade diagram which illustrates the angularity of the blade elements of the converter assembly in FIGURE 1;

FIGURE 3a is a schematic diagram of a torus circuit for a conventional converter assembly having a primary turbine stage of constant radius; and FIGURE 3b is a diagram similar to FIGURE 3a but which includes a primary turbine stage having a progressively increasing radius in accordance with the teachings of my invention.

In FIGURE 1, numeral 10 designates a portion of the crankshaft of an internal combustion engine in an automobile vehicle driveline. It is bolted by means of bolts 12 to a drive plate 14. This in turn is secured at its periphery to an impeller shell section 16, bolts 18 being provided for this purpose.

Shell section 16 is secured to a second shell section 20 at their adjoining peripheral margins as indicated at 22. Shell section 20 is semi-toroidal in form and is secured at its hub to an impeller sleeve shaft 24 which in turn can be journalled in the usual fashion within a supporting wall structure, not shown. This wall structure may form a part of a relatively stationary power transmission housing.

An outer impeller shroud 26 is secured at 28 to the inner surface of the shell section 20. It also is secured at its inner margin 30 to the inner margin of shell section 20.

An inner impeller shroud 32 cooperates with shroud 26 to define radial outflow passages. Impeller blades 34 are situated in these passages. As best illustrated in FIGURE 2, these blades are arranged in generally radial disposition with entrance and exit angles of 90° with respect to a tangential vector component.

The hub of impeller shell section 16 is connected to a pilot element 36 which is received within a pilot recess 38 in the crankshaft 10.

Numeral 40 designates generally a triple turbine assembly which includes a first bladed turbine section 42, a second bladed turbine section 44 and a third or main bladed turbine section 46. A turbine drum member 48 is connected at 50 to an outer shroud 52 for the turbine section 42. A cooperating inner shroud 54 defines with the shroud 52 fluid flow passages within which turbine blades 56 are situated.

Drum 48 carries an outer shroud 58 for the turbine section 44. This section includes an inner shroud 60 and blades 62 located between the shrouds 58 and 60. The blades 62 define axially directed flow passages at the outermost regions of the torus circuit.

The third turbine section 46 includes an outer shroud 64 which is connected by means of a radially disposed drive member 66 to the drum 48. The third turbine section includes also an inner shroud 68 and radial inflow blades 70 located between the shroud 64 and 68.

The shroud 64 is connected by rivet 72 to a hub 74 which is splined at 76 to a turbine shaft 78. The shaft is journalled by means of a bushing 80 within a stationary stator sleeve shaft 82. This shaft in turn may be connected in the usual fashion to a stationary portion of the transmission housing structure.

At the flow exit region of each bladed turbine section there is located a bladed stator. The stator located at the flow exit region of turbine section 42 is identified by reference numeral 84. It includes an outer shroud 86 and an inner shroud 88 with stator blades 90 located therebetween. Shroud 88 is supported by a central stator ring 92. Shroud 88 is anchored upon the central stator ring 92 by means of an overrunning brake 94, which includes a cammed outer race 96 and a cylindrical inner race 98 connected, respectively, to shroud 88 and ring 92. Overrunning brake elements in the form of rollers 100 are situated between the races to establish one-way braking action. Annular retainer rings 102 and 104 can be situated on either axial side of the elements 100.

A second stator 106 is located at the flow exit region of the turbine section 44. It includes a first shroud 108 and a second shroud 110 with fluid directing blades 112 situated therebetween. Shroud 110 is supported on the central stator ring 92 by means of an overrunning brake assembly 114. This corresponds to an overrunning brake assembly 94 and is effective to establish one-way braking of the shroud 110 with respect to the ring 92.

A third stator 116 is located between the flow exit region of the third turbine 46 and the flow entrance region of the impeller blades 34. It includes the ring 92 and another race 118 which is formed with a central opening 120. Stator blades 122 are located between the ring 92 and shroud 118.

Opening 120 receives an outer race 124 for overrunning brake 126. This brake includes an inner race 128 which is splined at 130 to the sleeve shaft 82. Overrunning brake elements 132 are located between the races 124 and 128. They are adapted to cam against the race 124 thereby providing one-way braking action for each of the stators, although stators 84 and 106 can freewheel with respect to stator 116 as explained previously.

A spacer 134 is located between the hub 74 and the overrunning brakes 126. It is held axially fast within the opening 120 by means of a snap ring 136. Another spacer 138 is located between the brake 126 and the inner margin 30 of the impeller shroud 26. It is held axially fast within the opening 120 by a snap ring 140.

In FIGURE 2 I have illustrated in blade cascade form the geometry of the individual blades of the various component elements of FIGURE 1. The direction of flow with respect to the blades is from the left to the right as shown by the flow vector. The direction of rotation is downward as illustrated by the rotation vector. The flow exit angles for a typical embodiment of my invention also have been indicated in FIGURE 2. The vector for a particle of fluid at the exit section of each of the converter elements can be computed readily.

For the purpose of comparing the performance of my improved torque converter mechanism with the performance of a converter having a comparable impeller diameter and a comparable capacity factor, I have provided in FIGURE 3a a diagram of a multiple element converter in which the flow exit region of the impeller discharges fluid axially into the first turbine section axial flow passages. In contrast, the converter diagram of FIGURE 3b shows an impeller with a radial flow exit region and a first turbine element with bladed, radial, outflow passages rather than axial flow passages.

For the purpose of comparing the performance of the converter arrangement of FIGURE 1, as illustrated schematically in FIGURE 3b, I will assume that a stalled condition exists and that the flow in the torus circuit is 5 cu. ft. per second I will assume also that the impeller speed is 200 radians per second.

The diameter relationships for the mechanisms illustrated schematically in FIGURES 3a and 3b are established so that the size factor for each converter will be matched. That is, the impeller speed divided by the square root of the torque of the impeller for one unit will be equal to the corresponding ratio for the other unit. This relationship has been achieved by using the dimensions noted in FIGURES 3a and 3b.

The torque acting upon any element of the torque converter is equal to the moment of momentum of the fluid that leaves the flow passages of that element minus the moment of momentum of the fluid that enters that same element. This latter quantity, however, equals the moment of momentum of the fluid that leaves the preceding element. Thus the torque for any converter element can be expressed as the moment of momentum of the fluid leaving the exit section of that element minus the moment of momentum of the fluid leaving the bladed flow exit region of the preceding element.

In the case of the turbine, the total turbine torque equals the sum of the torques acting upon each of the three turbine sections. Thus $T_t = T_1 + T_2 + T_3$. Where $T_t$=total turbine torque, $T_1$=torque acting upon the first turbine section, $T_2$=the torque acting upon the second turbine section and $T_3$=the torque acting upon the third turbine section. For any given turbine section, the torque $$= K\left[\left(\frac{Q}{A}\cot\beta + \omega r_p\right)r_p - \left(\frac{Q}{A}\cot B + \omega r_t\right)r_t\right]$$

where $K$=constant which takes into account the mass of the fluid.
$Q$=flow in cubic feet per second.
$A$=cross-sectional area of torus.
$\beta$=blade exit angle of impeller.
$B$=blade exit angle of turbine.
$\omega$=angular velocity.
$r_p$=mean radius of streamline at impeller flow exit.
$r_t$=mean radius of streamline at turbine flow exit.

A corresponding expression for the impeller torque can be written.

In the case of the embodiment of FIGURE 3a, the computations for $T_1$, $T_2$ and $T_3$ are tabulated as follows:

$$96(.48) + 30(.48) = 47 + 14.5 = 61.5$$
$$51(.48) + 30(.48) = 24.5 + 14.5 = 39$$
$$51(.48) + 30(.25) = 24.5 + 7.5 = 32$$
$$\text{Total} \underline{\phantom{xxxxxxxxxx}} 132.5 \text{ lb.-ft.}$$

The corresponding computation for the impeller torque for the embodiment of FIGURE 3a during stall is as follows:

$$96(.48) - 51(.25) = 47 - 12.5 = 34.5 \text{ lb.-ft.}$$

Torque ratio then is equal to 132.5 divided by 34.5=3.85.

In order to compare this torque ratio with the torque ratio obtained with the converter of FIGURE 3b, corresponding computations are made as follows:

$$96(.48) + 51(.25) = \qquad 34.5 \text{ (Impeller Torque)}$$
$$T_1\ 96(.48) + 30(.54) = 47 + 16 = 63.5$$
$$T_2\ 51(.54) + 30(.54) = 27.5 + 16 = 43.5$$
$$T_3\ 51(.48) + 30(.25) = 24.5 + 7.5 = 32$$
$$\overline{139.0}$$

The torque ratio thus is 139 divided by 34.5 or 4.03.

It will be apparent from a comparison of results of the computation of torque ratio for the converter of FIGURE 3a with the corresponding computation for the converter of FIGURE 3b that an augmentation of torque ratio is achieved notwithstanding the fact that the impeller diameter relationships and the size factor relationships for each converter are identical.

In addition to the foregoing advantages of the construction illustrated schematically in FIGURE 3b, the axial dimensions of the unit are substantially less than the corresponding axial dimensions of the converter in FIGURE 3a. This improves substantially the flexibility of the design and makes it adaptable for use in driveline installations where a large capacity converter is required but where space limitations prevent the use of a converter with the usual large dimensional torus.

Having thus described a preferred form of my invention, what I claim and desire to secure by a U.S. Letters Patent is:

1. A hydrokinetic torque converter mechanism comprising a bladed impeller, a multiple element turbine assembly and a multiple element stator assembly situated in toroidal fluid flow relationship in a common torus circuit, said turbine assembly comprising three bladed turbine elements connected together for rotation in unison, a turbine shaft connected to said turbine assembly, a power input member drivably connected to said impeller, a first stator of said stator assembly being situated between the flow exit section of the first turbine element and the flow entrance section of said second turbine element, a second stator of said stator assembly being situated between the flow exit section of said second turbine element and the flow entrance section of said third turbine element, a third stator of said stator assembly being situated between the flow exit section of said third turbine element and the flow entrance section of said impeller, overrunning brake means for anchoring said third stator against rotation in one direction while accommodating freewheeling motion in the opposite direction, second and third overrunning brake means for anchoring, respectively, said first stator and said second stator against rotation with respect to said third stator in one direction and accommodating freewheeling motion thereof in the opposite direction, the flow exit section of said impeller being situated at a radial outflow region of said circuit, the flow entrance section of said first turbine element being situated in a radial outflow region of said circuit and the flow exit section of said first turbine element being situated in a radially outward, axial flow region of said circuit.

2. A hydrokinetic torque converter mechanism comprising a bladed impeller, a multiple element turbine assembly and a multiple element stator assembly situated in toroidal fluid flow relationship in a common torus circuit, said turbine assembly comprising three bladed turbine elements connected together for rotation in unison, a turbine shaft connected to said turbine assembly, a power input member drivably connected to said impeller, a first stator of said stator assembly being situated between the flow exit section of the first turbine element and the flow entrance section of said second turbine element, a second stator of said stator assembly being situated between the flow exit section of said second turbine element and the flow entrance section of said third turbine element, a third stator of said stator assembly being situated between the flow exit section of said third turbine element and the flow entrance section of said impeller, overrunning brake means for anchoring said third stator against rotation in one direction while accommodating freewheeling motion in the opposite direction, second and third overrunning brake means for anchoring, respectively, said first stator and said second stator against rotation with respect to said third stator in one direction and accommodating freewheeling motion thereof in the opposite direction, the flow exit section of said impeller being situated at a radial outflow region of said circuit, the flow entrance section of said first turbine element being situated in a radial outflow region of said circuit and the flow exit section of said first turbine element being situated in a radially outward, axial flow region of said circuit, said second stator having fluid flow directing blades that define radial inflow passages with the flow exit section of said second stator discharging fluid in a radially inward direction into the flow entrance section of said third turbine element.

3. A hydrokinetic torque converter mechanism comprising a bladed impeller, a multiple element turbine assembly and a multiple element stator assembly situated in toroidal fluid flow relationship in a common torus circuit, said turbine assembly comprising three bladed turbine elements connected together for rotation in unison, a turbine shaft connected to said turbine assembly, a power input member drivably connected to said impeller, a first stator of said stator assembly being situated between the flow exit section of the first turbine element and the flow entrance section of said second turbine element, a second stator of said stator assembly being situated between the flow exit section of said second turbine element and the flow entrance section of said third turbine element, a third stator of said stator assembly being situated between the flow exit section of said third turbine element and the flow entrance section of said impeller, overrunning brake means for anchoring said third stator against rotation in one direction while accommodating freewheeling motion in the opposite direction, second and third overrunning brake means for anchoring, respectively, said first stator and said second stator against rotation with respect to said third stator in one direction and accommodating freewheeling motion thereof in the opposite direction the flow exit section of said impeller being situated at a radial outflow region of said circuit, the flow entrance section of said first turbine element being situated in a radial outflow region of said circuit and the flow exit section of said first turbine element being situated in a radially outward, axial flow region of said circuit, the flow exit section of said first turbine element, the flow entrance section of said second stator and the flow passages through said first stator and said second turbine element being situated at a common radius at the outermost fluid flow region of said circuit.

4. A hydrokinetic torque converter mechanism comprising a bladed impeller, a multiple element turbine assembly and a multiple element stator assembly situated in toroidal fluid flow relationship in a common torus circuit, said turbine assembly comprising three bladed turbine elements connected together for rotation in unison, a turbine shaft connected to said turbine assembly, a power input member drivably connected to said impeller, a first stator of said stator assembly being situated between the flow exit section of the first turbine element and the flow entrance section of said second turbine element, a second stator of said stator assembly being situated between the flow exit section of said second turbine element and the flow entrance section of said third turbine element, a third stator of said stator assembly being situated between the flow exit section of said third turbine element and the flow entrance section of said impeller, overrunning brake means for anchoring said third stator against rotation in one direction while accommodating freewheeling motion in the opposite direction, second and third overrunning brake means for anchoring, respectively, said first stator and said second stator against rotation with respect to said third stator in one direction and accommodating freewheeling motion thereof in the opposite direction, the flow exit section of said impeller being situated at a radial outflow region of said circuit, the flow entrance section of said first turbine element being situated in a radial outflow region of said circuit and the flow exit section of said first turbine element being situated in a radially outward, axial flow region of said circuit, said second stator having fluid flow directing blades that define radial inflow passages with the flow exit section of said second stator discharging fluid in a radially inward direction into the flow entrance section of said third turbine element, the flow exit section of said first turbine element, the flow entrance section of said second stator and the flow passages through said first stator and said second turbine element being situated at a common radius at the outermost fluid flow region of said circuit.

No references cited.

EDGAR W. GEOGHEGAN, *Primary Examiner.*